United States Patent [19]

Futaki

[11] Patent Number: 4,734,760
[45] Date of Patent: Mar. 29, 1988

[54] MULTI-COLOR IMAGE RECORDING APPARATUS WITH TWO SCANNERS AND ONE PRINTER

[75] Inventor: Kenji Futaki, Kawasaki, Japan

[73] Assignee: Kabushiki Kaisha Toshiba, Kawasaki, Japan

[21] Appl. No.: 77,945

[22] Filed: Jul. 27, 1987

Related U.S. Application Data

[63] Continuation of Ser. No. 930,067, Nov. 12, 1986, abandoned, which is a continuation of Ser. No. 741,574, Jun. 5, 1985, abandoned.

[30] Foreign Application Priority Data

Jun. 14, 1984 [JP] Japan ................. 59-120821

[51] Int. Cl.$^4$ ..................... H04N 1/40; H04N 1/46
[52] U.S. Cl. .................... 358/75; 358/257; 358/280
[58] Field of Search ............ 358/75, 78, 80, 280, 358/257, 256, 258, 181; 355/89

[56] References Cited

U.S. PATENT DOCUMENTS

| | | | |
|---|---|---|---|
| 4,133,007 | 1/1979 | Wessler et al. | 358/280 |
| 4,323,919 | 4/1982 | Fujii et al. | 358/75 |
| 4,350,997 | 9/1982 | Yamada | 358/78 |
| 4,378,566 | 3/1983 | Tsukamura | 358/75 |
| 4,517,590 | 5/1985 | Nagashima et al. | 358/75 |
| 4,532,554 | 7/1985 | Skala | 358/280 X |
| 4,547,810 | 10/1985 | Rutherford et al. | 358/280 X |
| 4,549,219 | 10/1985 | Sue et al. | 358/280 X |

FOREIGN PATENT DOCUMENTS

| | | |
|---|---|---|
| 0050481 | 4/1982 | European Pat. Off. |
| 2129648 | 5/1984 | United Kingdom ........... 358/75 |

Primary Examiner—James J. Groody
Assistant Examiner—Robert M. Bauer
Attorney, Agent, or Firm—Schwartz, Jeffery, Schwaab, Mack, Blumental & Evans

[57] ABSTRACT

A multi-color image recording apparatus has a plurality of scanners each of which may read out an image of a document. The scanners have an input device for inputting a control signal to designate one of the scanners. The image signal output from the scanner designated in response to the control signal of the input device, is supplied to a color printer so that a multi-color image is overlappingly recorded on a copy paper according to the image signal output from the designated scanner.

3 Claims, 9 Drawing Figures

MULTI-COLOR IMAGE RECORDING APPARATUS WITH TWO SCANNERS AND ONE PRINTER

This application is a continuation of application Ser. No. 930,067, filed Nov. 12, 1986, now abandoned, which is a continuation of application Ser. No. 741,574, filed June 5, 1985, now abandoned.

BACKGROUND OF THE INVENTION

This invention relates to a multi-color image recording apparatus, more specifically, the invention relates to an apparatus for recording a multi-color image according to a set of color component signals output from optical scanners.

As an example of such an apparatus, there is known a color copying machine of the thermal transfer type which reproduces color copies by using thermal transfer ink ribbons having a plurality of colorants. In a conventional apparatus of this kind, an original document is read out by an optical scanner and the image signal of the original document is separated into a set of color component signals representing the colors of the thermal transfer ink ribbons. These color component signals are stored in a memory, and are then read out for every color and the image of each color is thermally and overlappingly transferred onto copy paper, so that a multi-color image is recorded on the copy paper. Examples of such prior art machines are shown, for example, in U.S. Pat. Nos. 4,323,919 and 4,378,566 and European Patent Application No. 0,050,481.

In the copying machine mentioned above, however, as the scanner is assembled in the copying machine, it is necessary to bring the document to be copied to the copying machine. Further, other documents cannot be read out while the copying machine is at work.

SUMMARY OF THE INVENTION

Accordingly, it is an object of the present invention to provide a multi-color image recording apparatus which is convenient to use and which is excellent in operability.

Another object of the present invention is to provide a multi-color image recording apparatus in which there are provided a plurality of scanners.

These and other objects are achieved by providing an improved multi-color image recording apparatus including first scanner means for reading out an image information of an original document by optically scanning the original document, second scanner means located apart from the first scanner means and for reading out the image information of the original document by optically scanning the original document, means for inputting a control signal to designate one of the first and second scanner means, control means for activating one of the first and second scanner means in response to the control signal from the input means, means for converting an image signal output from the scanner means activated by the control means to a set of color component signals, and means for recording a color image by overlapping images for every color component on an image recording medium according to the color component signals output from the converting means.

BRIEF DESCRIPTION OF THE DRAWINGS

These and other objects and advantages of the invention will become more apparent and more readily appreciated from the following detailed description of the preferred embodiments of the invention taken in conjunction with the accompanying drawings, of which.

DETAILED DESCRIPTION OF THE PREFERRED EMBODIMENTS

Figure 1:
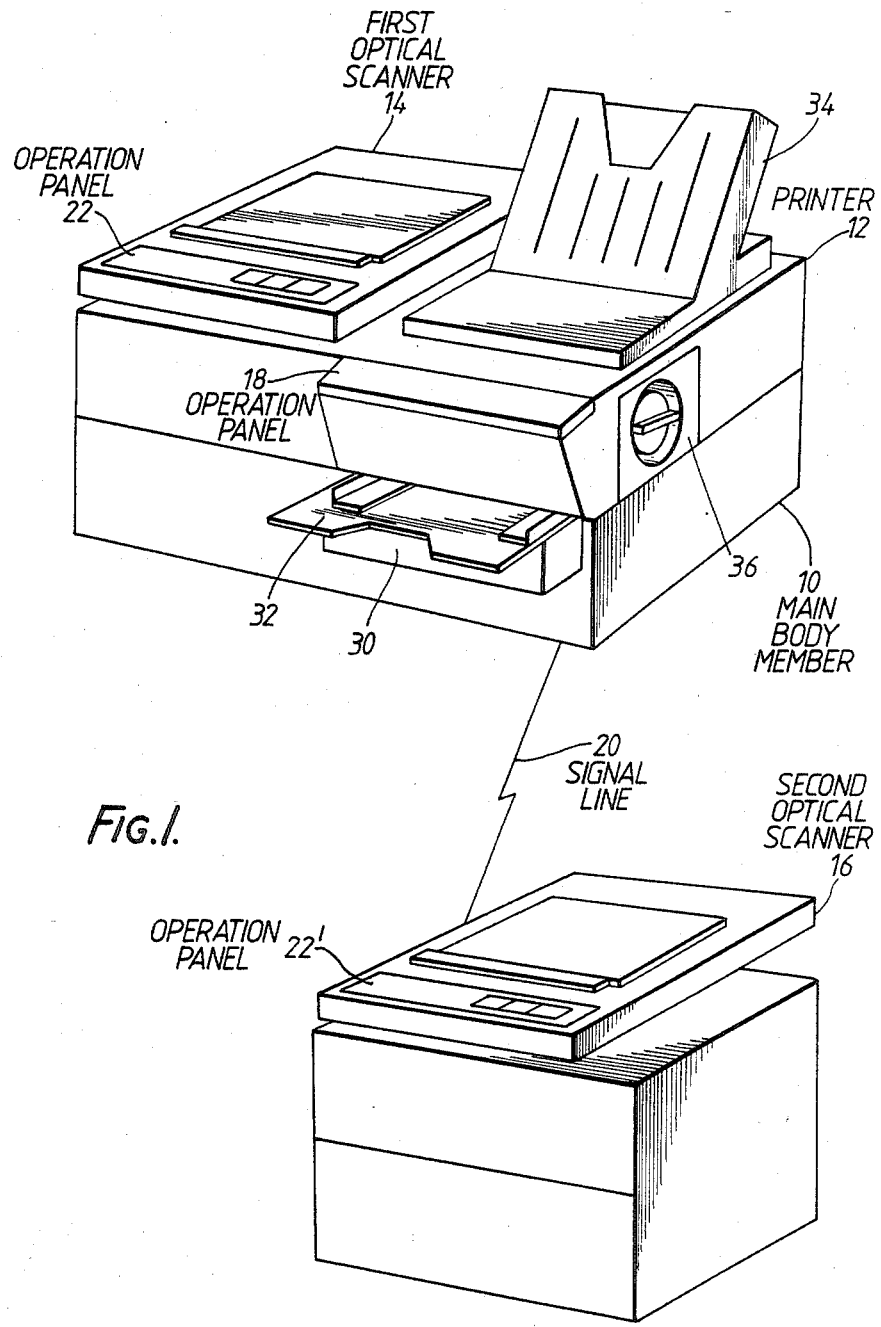
FIG. 1 is a perspective view of a color copying machine according to the present invention.

FIG. 1 shows the copying machine as an embodiment of a multi-color image recording apparatus according to the present invention.

Figure 2:
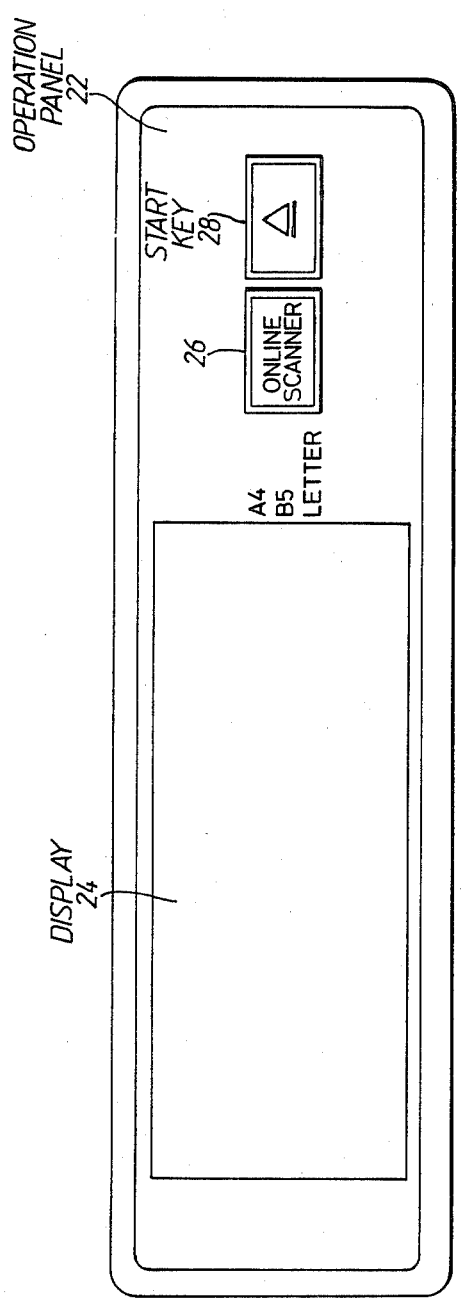
FIG. 2 is a plan view of an operation panel of the copying machine shown in FIG. 1.

The copying machine comprises a main body member 10 having a printer 12 thereon and a first optical scanner 14. A second optical scanner 16 is provided remote from the main body member 10. An operation panel 18 is provided on the front side of the upper surface of a main body member 10. This panel 18 has a start key, a quantity display, and a key for setting the number of copies. Scanner 14 (main scanner) is mounted on main body member 10 of the copying machine. Scanner 16 (remote scanner) is located apart from main body member 10 and connected with main body member 10 by means of a signal line 20. Scanners 14 and 16 are provided respectively with identical operation panels 22 and 22'. Scanner 22 is shown in FIG. 2 although the same components are found on remote scanner 22' and although not illustrated may be referred to by respective primed numbers. Operation panel 22 (22') has a display 24 (24') for indicating the operation state and the copying conditions of the copying machine and the operation state of the other scanner 16, an on-line scanner key 26 (26') for designating scanner 14 or 16 and a start key 28 (28') for starting the scanning operation. On the front part of the right side of main body member 10, there are a cassette 30 and a manual feed table 32 which supply copy sheets to printer 12. Further, on the upper part of the right side of main body 10, a tray 34 is provided in which copy sheets are fed into the printer 12. On the right side of main body member 10, a cassette exchange port 36 is also provided for exchanging cassettes of ink ribbon to be used in the printer 12.

Figure 3:
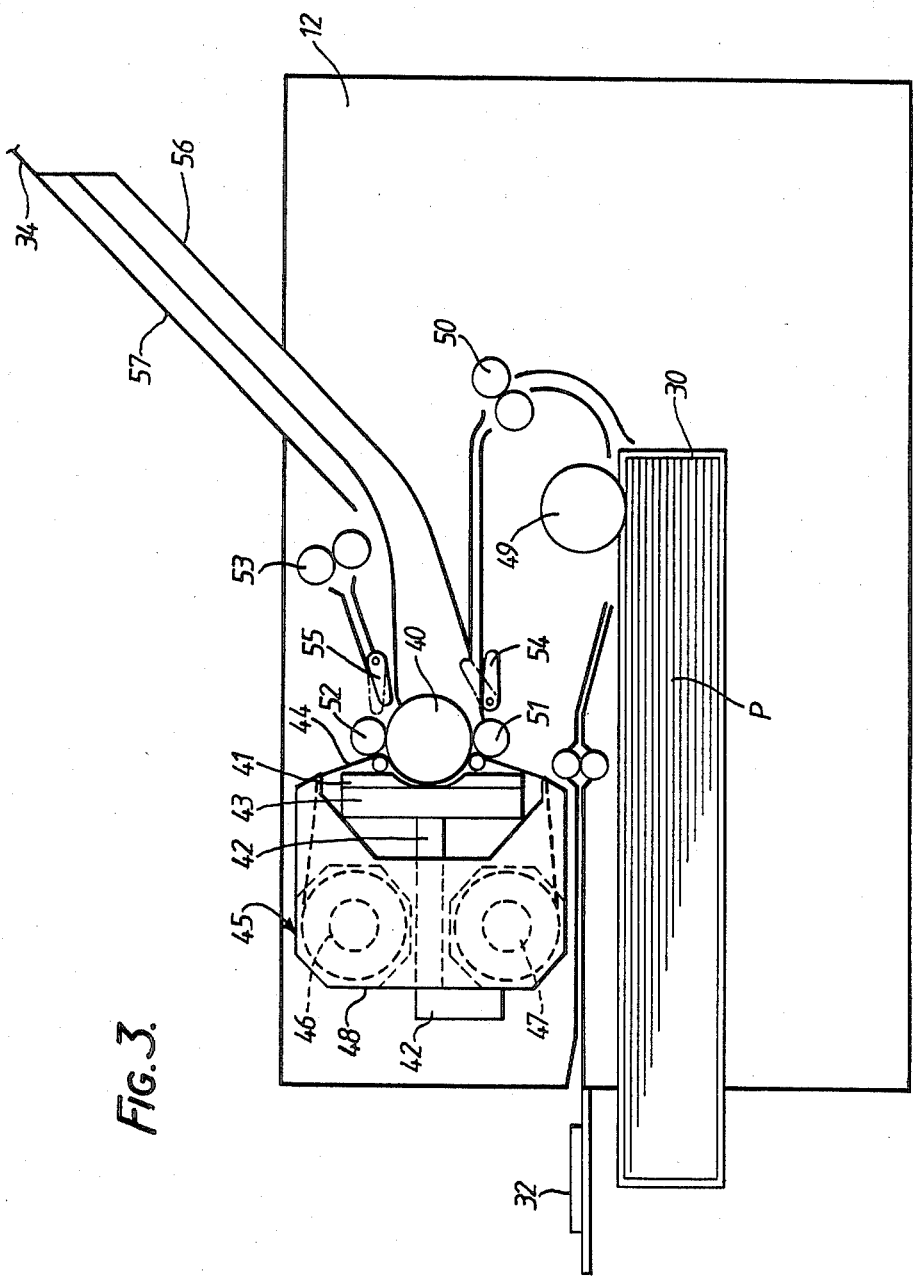
FIG. 3 is a front view of the inside of a printer of the copying machine shown in FIG. 1.

Referring to FIG. 3, the details of printer 12 will be explained. A platen roller 40 is horizontally attached in the substantial central portion of printer 12. A thermal head 41 is attached on the front side of platen roller 40. Thermal head 41 is secured to a radiator 43 integrally formed on a rear end surface of a holder 42. A ribbon cassette 45, which encloses a thermal transfer ink ribbon 44, is detachably installed in holder 42 through cassette exchange port 36. When ribbon cassette 45 is installed in holder 42, thermal transfer ink ribbon 44 is thus interposed between thermal head 41 and platen roller 40. Ribbon cassette 45 comprises a supply reel 46 and a take-up reel 47 to which both ends of ink ribbon 44 are respectively connected, and a casing 38. A portion of casing 38 is opened so that thermal transfer ink ribbon 44 is interposed between platen roller 40 and thermal head 41. When cassette 45 is installed in printer 12, supply reel 46 and take-up reel 47 are coupled to a drive shaft of a motor (not shown) for carrying ink ribbon 44 and are rotated. Paper feed cassette 30 in which copy papers P are stored is positioned below platen roller 40. Copy papers P in cassette 30 are picked up one-by-one due to the rotation of a feed roller 49 provided beneath platen roller 40 in the oblique direction on the right side thereof. Copy paper P, taken out from cassette 30 or supplied from table 32, is aligned by a pair of rollers 50 provided above feed roller 49 in the oblique direction on the right side thereof. Thereafter, copy paper P is carried toward platen roller 40. Two press rollers 51 and 52 come into pressure contact with platen roller 40, and copy paper P is wrapped around platen roller 40 by rollers 51 and 52, where it is accurately set in a predetermined position for transportation. When copy paper P reaches between thermal head 41 and platen roller 40, the ink coated on ink ribbon 44 is transferred from ribbon 44 onto paper P due to the heat selectively radiated from thermal head 41, so that copy images are formed on paper P. Thereafter, copy paper P is discharged onto tray 34 through a paper discharge roller 53. Gates 54 and 55 are provided behind pressing rollers 51 and 52, so that the path for copy paper P is selectively blocked and opened. Gate 54 does not block the path when paper P is transported in the forward direction. On the other hand, when paper P is transported in the reverse direction to perform the transfer by the second and subsequent color inks, gate 54 blocks the path and directs paper P toward a first guide plate 56. Until the transferring operation of all of the color inks are performed, gate 55 blocks the transport path so that paper is not carried to copy discharge tray 34 but is guided toward a second guide plate 57. After the transferring operation has been completed, gate 55 opens to permit paper P to be transported to tray 34. Paper feed cassette 30 may be freely attached to and detached from main body member 10 through the front surface thereof. In addition, manual feed table 32 permits the manual feed of paper P one-by-one by hand.

Figure 4:
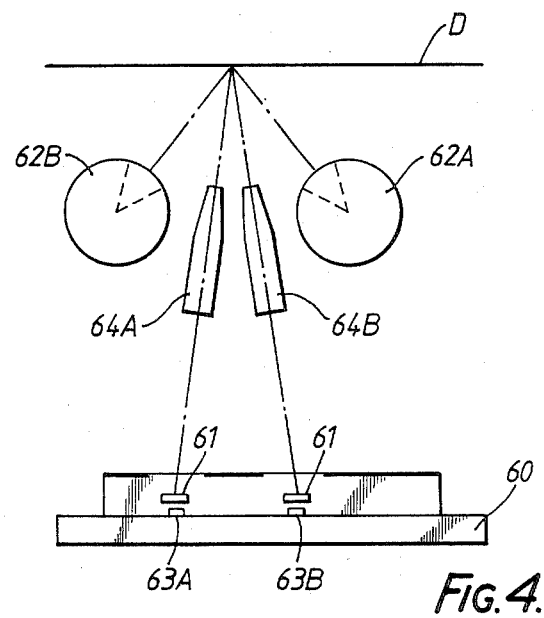
FIG. 4 is a front view of a scanner of the copying machine.
Figure 5:
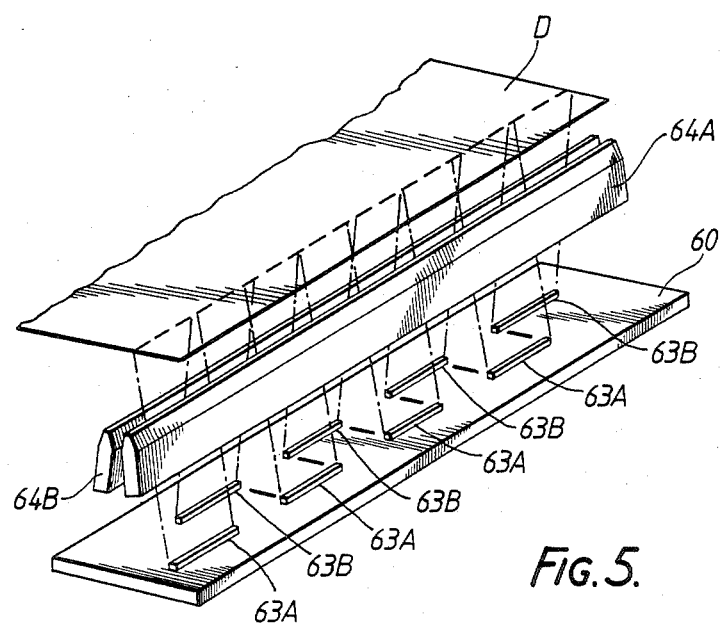
FIG. 5 is a perspective view of the scanner shown in FIG. 4.
Figure 6:
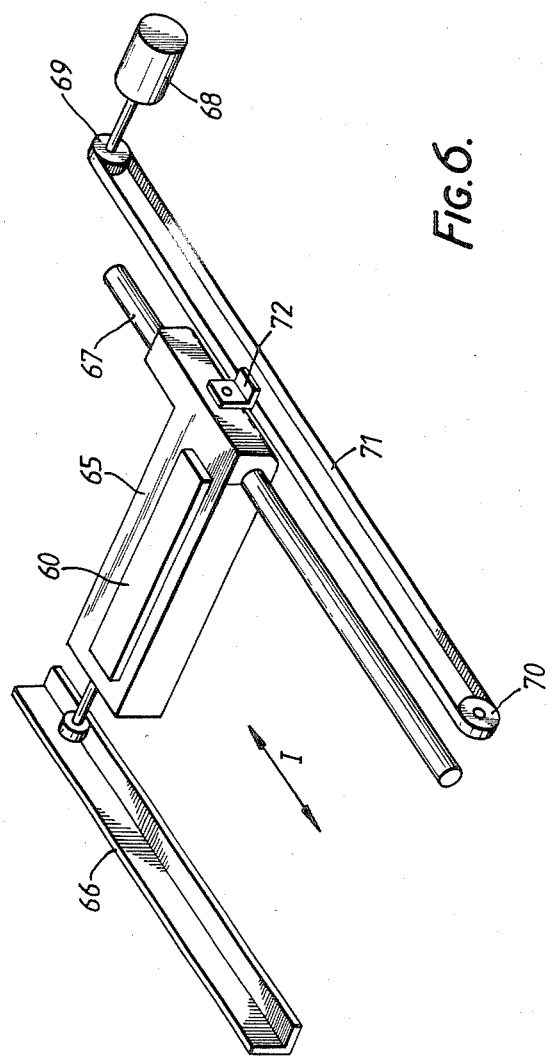
FIG. 6 is a perspective view of a scanning mechanism of the scanner.

Scanners 14 and 16 have the same construction and each of them comprises a read-out section shown in FIGS. 4 and 5 and a scanning mechanism which reciprocally moves the read-out section along the original document as shown in FIG. 6. The read-out section comprises exposure lamps 62A and 62B to obliquely illuminate one scanning line of a document D from both sides of the scanning line, a number of first and second photoelectric converters 63A and 63B to receive light reflected from document D and to output image signals, and fiber lens arrays (trade name Selfoc) 64A and 64B. As shown in FIG. 5, photoelectric converters 63A and 63B are alternately arranged in parallel to one another and consist of, for example, CCD line image sensors or the like. Color filters 61 of R (red), G (green) and B (blue) which are most desirable for color reproduction, are attached like a mosaic for every pixel to photoelectric converters 63A and 63B. The above-mentioned components define a read-out device 60.

This device 60 is attached to the scanning mechanism, as shown in FIG. 6, which may be reciprocally moved along document D in the direction indicated by an arrow I. Read-out device 60 is fixed to a carriage 65. This carriage 65 is guided by a guide rail 66 and a guide bar 67 so that it may be freely reciprocally moved. An endless belt 71 is installed between a drive pully 69 and a follower pulley 70 along guide bar 67. Drive pulley 69 is coupled to the drive shaft of a scanning motor 68 whose rotational direction may be reversed. A part of endless belt 71 is fixedly connected to carriage 65 by means of a fixing member 72, so that carriage 65 is moved in the direction of the arrow I in association with the rotation of scanning motor 68.

Figure 7:
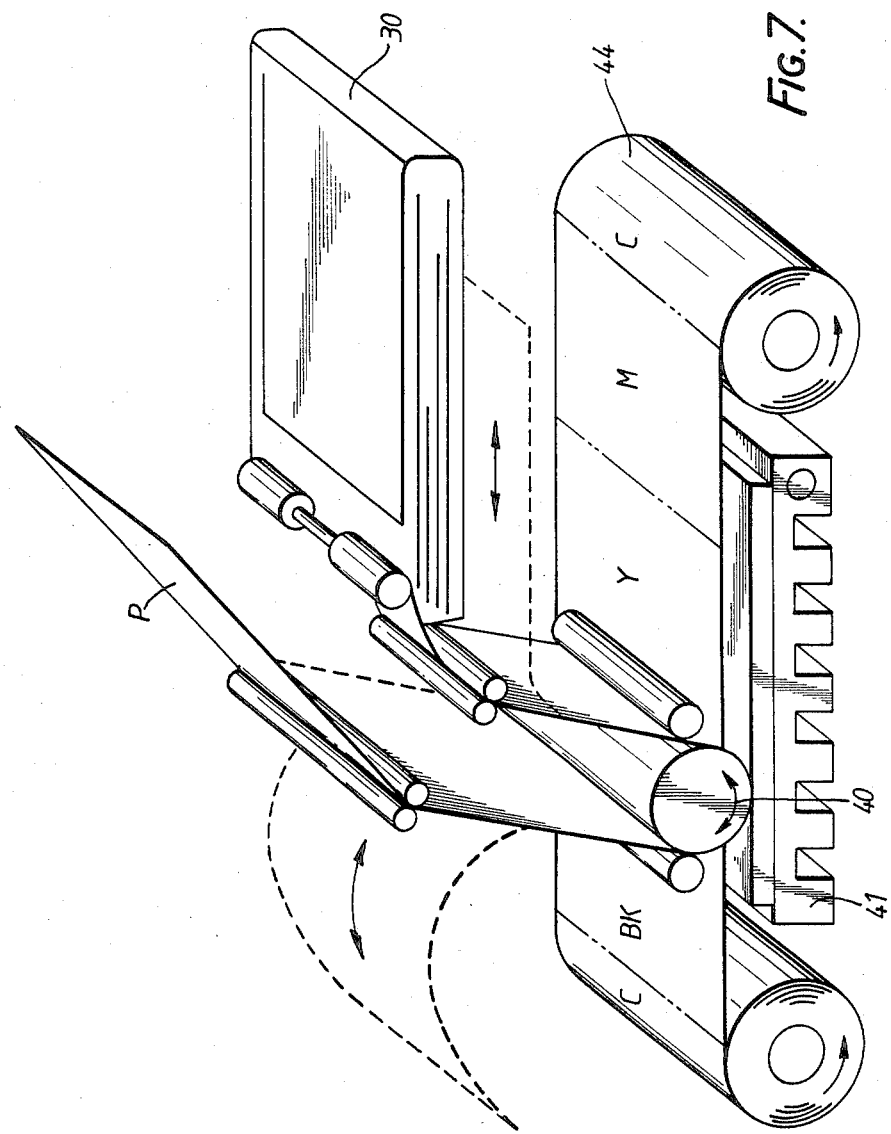
FIG. 7 is a diagram showing the principle of the reproduction by the printer.

Referring to FIGS. 3 and 7, the copying principle of the thermal transfer printing will be described. Thermal head 41 has an array of heating elements arranged in a line along the axial direction of platen roller 40 at the contact surface with platen roller 40. When copy paper P supplied from rollers 50 is inserted between platen roller 40 and ink ribbon 44, thermal head 41 presses copy paper P onto platen roller 40 through ink ribbon 44, and at the same time, the heating element array is selectively heated in accordance with the image signal output from read-out device 60. The ink as the colorant on ink ribbon 44 is melted and is thermally transferred on copy paper P on a line-by-line basis. The lateral width of ink ribbon 44 is equal to that of copy paper P. The ink regions of Y (yellow), M (magenta), C (cyan), and BK (black) are repeated on ink ribbon 44 for every length which is substantially equal to (or slightly longer than) the longitudinal length of copy paper P. The images of yellow, magenta, cyan, and black are overlappingly transferred on copy paper P for every color. After the transferring of the images of all scanning lines for each color has been completed, copy paper P is carried in the reverse direction, so that the first scanning line of copy paper P is located between thermal head 41 and platen roller 40. Ink ribbon 44 is slightly transported in the forward direction, so that the first portion of the ink region of the next color is located at the position opposite thermal head 41.

Figure 8:
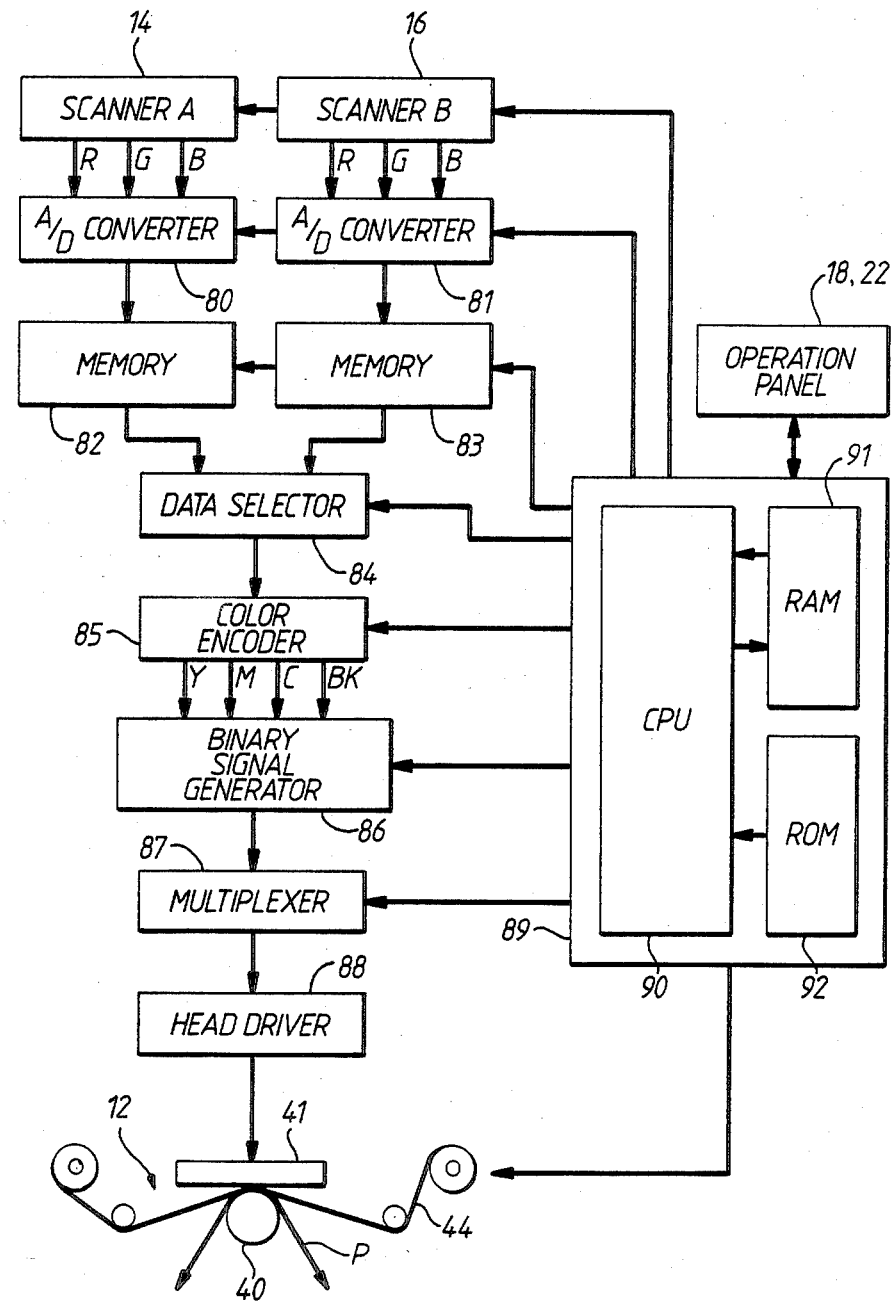
FIG. 8 is a block diagram of a control device for controlling the operation of the copying machine shown in FIG. 2.

Referring to FIG. 8, the output color component signals R, G and B of scanners 14 and 16 are input to memories 82 and 83 through A/D converters 80 and 81, respectively. The color component signals are stored in memories 82 and 83, and subsequently supplied to a color encoder 85 through a data selector 84. Data selector 84 serves as a multiplexer to feed the color component signals from memory 82 or 83 to the color encoder 85 depending upon which memory is selected to be printed. Color encoder 85 converts the output color component signals R, G and B of data selector 84 to the color component signals Y, M, C and BK of the four colors of the ink ribbon 44. The output component signals Y, M, C and BK of color encoder 85 are supplied to a binary signal generator 86 and converted to the binary coded signals thereby. Namely, they are converted to the on/off signals according to the heating element to be selectively heated. The on/off signals of the component signals Y, M, C and BK are supplied to a multiplexer 87, and one of the color component signals is selected thereby. An output of multiplexer 87 is supplied through a head driver 88 to printer 12, i.e., thermal head 41. The signals output from operation panels 18 and 22 are input to a controller 89 consisting of a microcomputer. The control signals output from controller 89 are supplied to scanners 14 and 16, A/D converters 80 and 81, memories 82 and 83, data selector 84, color encoder 85, binary signal generator 86, multiplexer 87, printer 12 and operation panels 18 and 22. Controller 89 comprises a CPU (Central Processing Unit) 90, a RAM (Random Access Memory) 91, and a ROM (Read Only Memory) 92. ROM 92 stores a sequence control program for controlling the copying machine. RAM 91 has a work area which stores a set of data of copying conditions and flags for indicating various control status. CPU 90 reads out control instructions step-by-step from ROM 92 and outputs various control signals to each component described above.

As mentioned above, operation panel 22 (22') of scanner 14 (16) has an on-line scanner key 26 (26') for designating one of scanners 14 and 16, and display 24 (24') for indicating the copying conditions of the copying machine and the selection state of scanners 14 and 16. The copying machine assumes an on-line or remote mode where, for example, scanner 16 is operative to start the optical scan of document D when on-line scanner key 26' is depressed. On the other hand, the copying machine assumes a local mode where scanner 14 is operative to start the optical scan of document D when on-line scanner key 26' is depressed again or when key 26 is subsequently operated. When the power supply is initially turned on, the machine enters the local mode. In the local mode, scanner 16 may be selected by depressing scanner key 26 or 26'. When three or more scanners are provided, controller 89 selects one of the scanners depending on the number of times of the operation of on-line key 26 or depending upon which remote key 26', 26" etc. is selected. The scanner selected by on-line scanner keys 26, 26', 26" etc. may also be indicated on operation panel 18 of main body member 10.

Now, when the machine is ready for operation of a selected optical scanner, a WAIT display goes off and a READY display lights up on displays 24 and 24' provided on scanners 14 and 16. In this state, after selection of the scanners has been performed by the manner described above, document D is optically scanned and thus the copy is reproduced by setting document D on the selected scanner and operating start key 28. When one scanner is at work, the READY display thereof flickers and the WAIT display of other scanner lights and the READY display of the other scanner goes off. As a result, an operator may find which scanner is inhibited from use. When one copy run is completed, the READY displays of all scanners light again and the machine is ready for operation of optical scanning for a subsequent document. In such a manner as described above, the conditions of the scanners and the machine may be observed from all scanners even if some scanners are located apart from the main body member 10 by providing operation panel 22, 22' on scanners 14 and 16. Thus, the machine permits the distributed copying task by operating on-line scanner key 26, 26' of the scanner to be selected.

Further, if memories 82 and 83 have enough capacity to store all of the information according to the document to be optically scanned, controller 89 permits one to simultaneously use both scanners 14 and 16, and/or to scan and store with one scanner while simultaneously printing out previously stored image data from another scanner.

Figure 9:
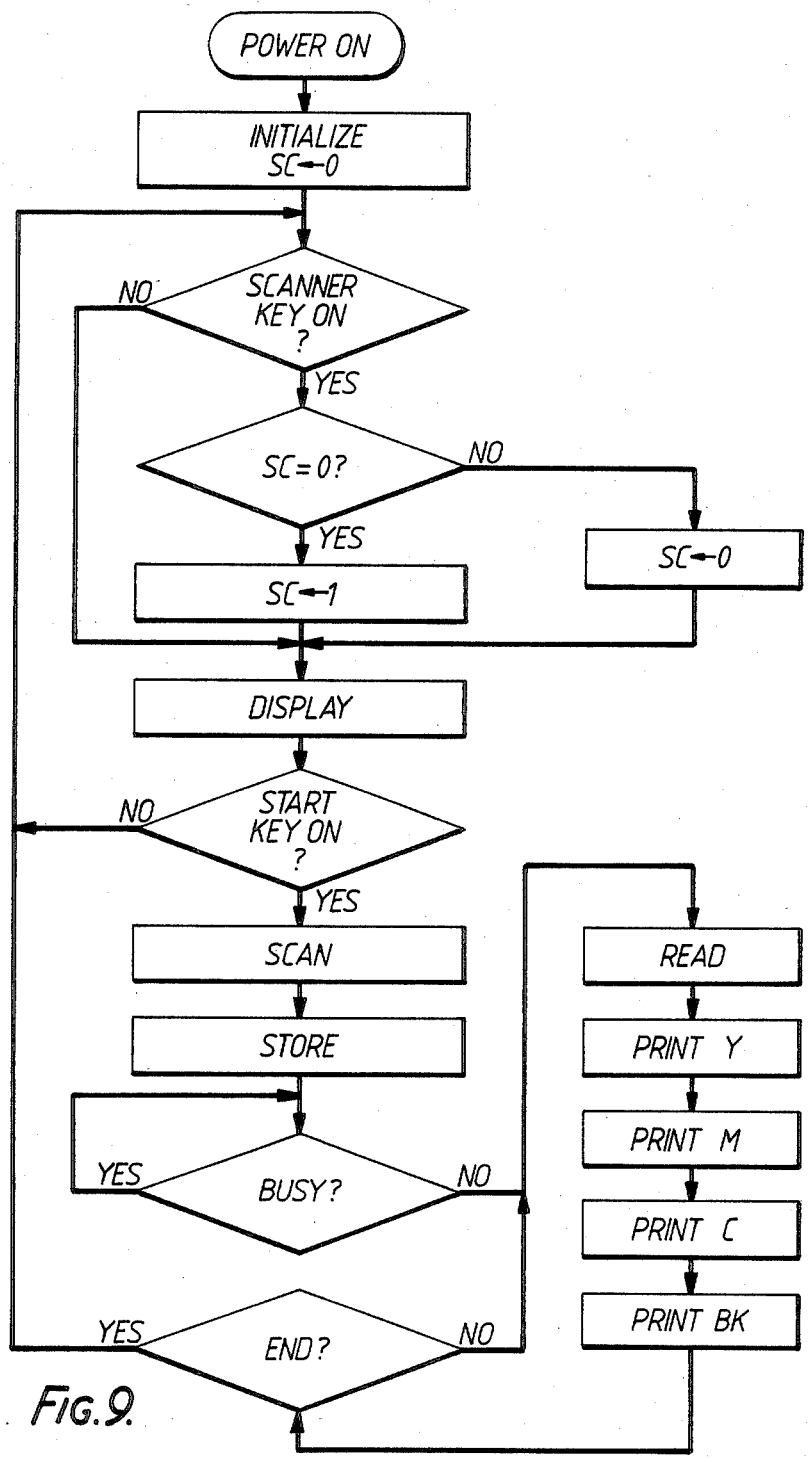
FIG. 9 is a flowchart for explaining the control sequence of the control device.

Referring to FIG. 9, the operation of the copying machine will be explained. When the power supply of the machine is turned on, the machine is initialized. The WAIT displays of operation panels 22 extinguish and the READY displays light up. Memories 82 and 83 and RAM 91 are also cleared. When RAM 91 is initialied, a logic "0" is set in a flag register SC then, controller 89 checks if on-line scanner key 26 or 26' is operated. When on-line scanner key 26 or 26' is operated, controller 89 checks if a logic "0" is set in a flag SC of RAM 91. If not, the logic "0" is set in the flag SC. If the logic "0" has already been set in the flag SC, a logic "1" is set in the flag SC. Namely, the set data in the flag SC is alternatively changed. The logic "0" in the flag SC means that scanner 14 has been selected for scanning the original document, i.e., the machine enters the local mode. On the other hand, when scanner 16 is selected, i.e., the on-line mode is designated, the flag SC stores the logic "1". Thus, the READY display of scanner 14 and the WAIT display of scanner 16 are actuated in accordance with the contents of the flag SC, i.e., the READY display of scanner 14 flickers and the WAIT display of scanner 16 lights when the logic "0" is set in the flag SC.

Thereafter, controller 89 checks if start key 28 (28') of the selected scanner is operated. When the start key 28 (28') of the selected scanner 14 or 16 is operated, the image information of the original document is read out in response to the operation of start key 28 (28'). The read-out image information is stored in memory 82 or 83. Next, the controller checks if the printer 12 is busy. If not, the stored data is read out from memory 82 or 83 which is designated in accordance with the contents of the flag SC. This date is supplied to color encoder 85 through data selector 84. The printing operation of printer 12 is performed in accordance with the color component signals Y, M, C and BK output from color encoder 85.

Namely, the output signals of photoelectric converters 63A and 63B are transmitted to A/D converters 80 and 81. The analog output signals of photoelectric converters 63A and 63B are converted to digital signals and stored in memories 82 and 83. The data to be used for printing is selectively read out by selector 84 from memory 82 or 83. The output color component signals R, G and B from selector 84 are converted by color encoder 85 to the four color component signals Y, M, C and BK for the thermal transfer printing. The first color, i.e., the Y signal is selected by multiplexer 87 and is supplied to thermal head 41, so that the Y image according to the Y signal is formed on copy paper P. Then, the second color, i.e., the M signal is selected by multiplexer 87 and is supplied to thermal head 41, so that the M image according to the M signal is formed on copy paper P which the Y image has already been formed. Further, the third color, i.e., the C signal is selected and supplied to thermal head 41, so that the C image according to the C signal is formed on copy paper P which both Y and M images have already been formed. Next, the fourth color, i.e., the BK signal is selected and supplied, and thus an image of four colors Y, M, C and BK is formed on copy paper P. This copy paper P is reciprocally moved by platen roller 40 four times. Namely, copy paper P is carried in the reverse direction after the transfer of the first color is performed. At this time, gate 54 shuts the path and copy paper P is guided toward first guide plate 56. Next, ink ribbon 44 is carried in the forward direction so that the ink region of the next color is adjacent to thermal head 41. Thereafter, the transfer of the next color is performed. When the operation described above is repeated and the image formation of four colors is completed, gate 55 is operated and copy paper P is discharged onto tray 34.

Then, the operation step returns to the scanner selecting routine.

When the printing operation is completed, the image data used for printing is erased from memories 82 and 83.

Obviously, numerous modifications and variations of the present invention are possible in light of the above teachings. It is, therefore, to be understood that within the scope of the appended claims, the invention may be practiced otherwise than as specifically described herein.

What is claimed is:

1. A multi-color recording apparatus comprising:
   a copying unit having a first scanner for reading out an image of a document by optically scanning the document, and a first start key for initiating the operation of said first scanner;
   a scanning unit located apart from said copy unit and having a second scanner for reading out an image of a document by optically scanning the document, a manually operable on-line scanner key for designating said second scanner and a second start key for initiating the operation of said second scanner;
   said copying unit further having a controller for converting an output signal of one of said first and second scanners to a set of color component signals, a printer for recording a color image by overlapping images for every color component on an image recording medium according to the color component signals output from said controller and a mode key for designating one of said first and second scanners, so that one of said first and second scanners designated by said mode key is operative to start the optical scan of the document; and
   a communication line, connected between said scanning unit and said copying unit, for transmitting the output signal from said second scanner to said controller.

2. A multi-color recording apparatus according to claim 1, wherein said printer is a printer of the thermal transfer type.

3. A multi-color recording apparatus according to claim 1, further comprising:
   display means, provided on each of said copying unit and said scanning unit, for indicating that one of said first and second scanners designated by one of said on-line scanner key and mode key is at work and the non-designated scanner is not ready for scanning.

* * * * *